(12) United States Patent
Hampole et al.

(10) Patent No.: US 8,965,876 B2
(45) Date of Patent: Feb. 24, 2015

(54) ECOSYSTEM FOR MANUALLY MARKED SEARCHABLE FEEDS ON PUBLISHER SITES

(75) Inventors: Rahul Hampole, San Francisco, CA (US); Nageswara R. Pobbathi, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 107 days.

(21) Appl. No.: 13/353,061

(22) Filed: Jan. 18, 2012

(65) Prior Publication Data

US 2013/0185277 A1 Jul. 18, 2013

(51) Int. Cl.
*G06F 17/30* (2006.01)

(52) U.S. Cl.
USPC ........... 707/710; 707/726; 707/770; 715/206; 715/968

(58) Field of Classification Search
CPC .......... G06F 17/30011; G06F 17/3002; G06F 17/30321
USPC ......... 707/705, 708, 709, 710, 711, 726, 731, 707/741, 742, 743–746, 754–755, 764, 769, 707/770–771, 779, 809, 740, E17.085, 707/999.002, 999.1; 715/206, 781, 968, 715/969

See application file for complete search history.

(56) References Cited

U.S. PATENT DOCUMENTS

| | | | |
|---|---|---|---|
| 8,239,367 B1* | 8/2012 | Zamir et al. | 707/710 |
| 2011/0029504 A1* | 2/2011 | King et al. | 707/709 |
| 2011/0173180 A1* | 7/2011 | Gurumurthy et al. | 707/711 |
| 2011/0184956 A1* | 7/2011 | Dantsker et al. | 707/741 |
| 2012/0278343 A1* | 11/2012 | Steele et al. | 707/754 |

* cited by examiner

*Primary Examiner* — Greta Robinson
(74) *Attorney, Agent, or Firm* — Pillsbury Winthrop Shaw Pittman LLP

(57) ABSTRACT

Techniques for generating and publishing searchable feeds for websites are provided. An indication is received of content of interest of a selected website. The selected website is crawled to retrieve a plurality of pages. The retrieved pages are processed according to the indicated content of interest to generate structured content. The structured content is indexed to generate an index. A query interface is provided that receives queries directed to the index, applies the received queries to the index, and transmits responses to the received queries.

24 Claims, 10 Drawing Sheets

602 crawl the selected website to retrieve the plurality of web pages

ECOSYSTEM FOR MANUALLY MARKED SEARCHABLE FEEDS ON PUBLISHER SITES

BACKGROUND OF THE INVENTION

1. Field of the Invention

The present invention relates to online search engines.

2. Background Art

A search engine is an information retrieval system used to locate documents and other information stored on a computer system. Search engines are useful at reducing an amount of time required to find information. One well known type of search engine is a Web search engine which searches for documents, such as web pages, on the "World Wide Web." Examples of such search engines include Yahoo! Search™ (at http://www.yahoo.com), Bing™ (at http://www.bing.com), and Google™ (at http://www.google.com). Online services such as LexisNexis™ and Westlaw™ also enable users to search for documents provided by their respective services, including articles and court opinions. Further types of search engines include personal search engines, mobile search engines, and enterprise search engines that search on intranets, among others.

To perform a search, a user of a search engine supplies a query to the search engine. The query contains one or more words/terms, such as "hazardous waste" or "country music." The terms of the query are typically selected by the user to as an attempt find particular information of interest to the user. The search engine returns a list of documents relevant to the query. In a Web-based search, the search engine typically returns a list of uniform resource locator (URL) addresses for the relevant documents, which is displayed to the user in a search results page. If the scope of the search resulting from a query is large, the returned list of documents may include thousands or even millions of documents.

Many publishers that operate websites accessible on the Internet have an understanding of content desired by users, but do not have access to such content. For example, a publisher who is a connoisseur of vintage automobiles may desire to serve an audience that is interested in vintage automobiles. As such, the publisher may desire to obtain online content associated with vintage automobiles, and to provide such content in an up-to-date and automatic fashion. The publisher may know of other websites that contain such content and that are currently accessible by users. However, conventionally, it is a time consuming manual process for the publisher to retrieve and process that content into a form that the publisher desires for it to be shown on the publisher's website.

BRIEF SUMMARY OF THE INVENTION

Techniques for generating and publishing searchable feeds for selected websites are provided. A publisher is enabled to have a search index generated for a selected website. The search index functions as a searchable feed for receiving and responding to queries regarding the content of the selected website. For instance, the publisher may provide a search interface (e.g., on a website of the publisher) that enables queries to be provided to the index. Responses to the queries may be displayed to users on the publisher's website. Furthermore, the search index may be shared with other publishers, such that the other publishers can provide a search interface for the search index on their websites to process queries. Still further, combined indexes may be generated from multiple indexes. Search interfaces may be provided to enable queries to be submitted to the combined indexes, and responses to the queries to the combined indexes may be displayed to users on publisher websites.

In one method implementation, an indication is received of content of interest of a selected website. In one implementation, the indication may be provided by marking sample pages of the selected website. A plurality of pages is retrieved from the selected website (e.g., by crawling the website). The retrieved pages are processed according to the indicated content of interest to generate structured content. The structured content is indexed to generate an index. A query interface is provided that receives queries directed to the index, applies the received queries to the index, and transmits responses to the received queries.

In one system implementation, a searchable feed generating system includes a content retrieval engine, an indexing engine, and a query interface. The content retrieval engine receives an indication of content of interest of a selected website, retrieves a plurality of pages from the selected website, and processes the retrieved pages according to the indicated content of interest to generate structured content. The indexing engine indexes the structured content to generate an index. The query interface receives queries directed to the index, applies the received queries to the index, and transmits responses to the received queries.

Computer program products are also described herein. The computer program products include a computer-readable medium having computer program instructions recorded thereon that enable searchable feeds to be generated for websites, that enable the searchable feeds to be queried, and that enable further embodiments as described herein.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
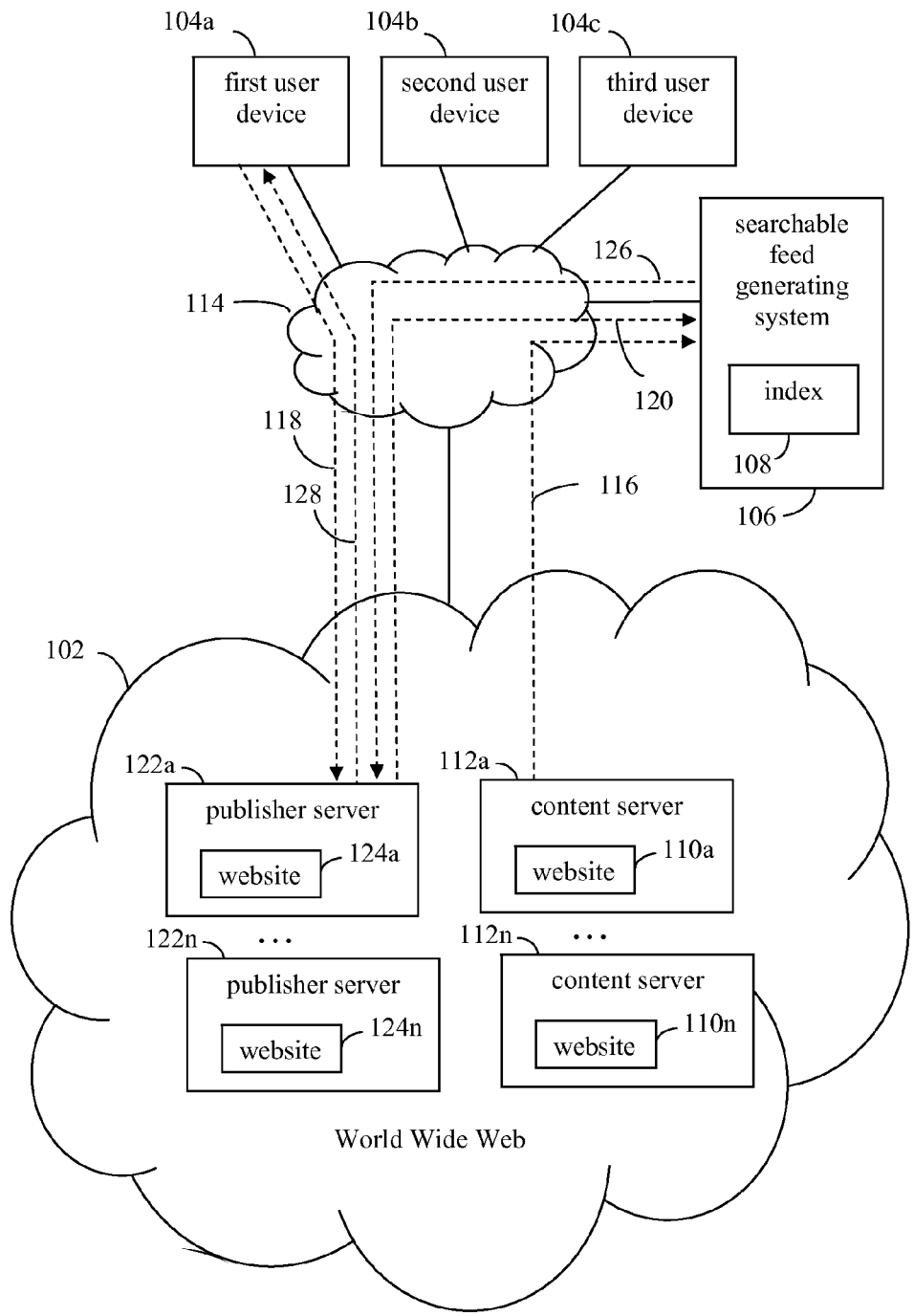
FIG. 1 shows a block diagram of an online system in which searchable feeds may be generated and accessed, according to an example embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection.

II. Example Embodiments

Many publishers that operate websites accessible on the Internet have an understanding of content desired by users, but do not have access to such content. Furthermore, content available on the World Wide Web today has the problem that it is largely unstructured. For example, a website for a restaurant may include information for the restaurant such as an address, the hours of operation, and a menu. This information can be read and understood by humans, but is basically generic text to a machine. As such, such information provided by websites is difficult to structure in an automatic fashion.

Embodiments enable publishers to editorially mark sites for content of interest to them, and cause that content to be indexed and made searchable. Publishers can then use the searchable content to display enhanced content to their users. Furthermore, the publishers can share the marked content in a searchable form with other publishers to help improve each other's sites. Such a "searchable feed ecosystem" encourages sharing and hence causes search experiences on publisher sites and on sites that manage the feed ecosystem to be better.

Thus, embodiments enable the creation and indexing of structured content. This marking of websites to indicate context of interest may be performed by anyone, including publishers of the websites, developers, or anyone else that is interested in such information. As such, a wide variety of persons are enabled to create structured content from content that is already available on the World Wide Web. Accordingly, embodiments provide an ecosystem that enables the creation of, and the consumption of, such structured content by all types of users.

For instance, a Publisher A that is a connoisseur of vegetarian food may desire to provide reviews of restaurants, recipes, and a meet up group for the audience. However, Publisher A may not have any reviews of restaurants. However, Publisher A may know of an online website called "VegansOnline" that provides reviews of restaurants, and that many of his potential customers may access to view the reviews. Embodiments enable publishers, such as Publisher A, to simplify the process of building a search website by generating a search index for a selected website. In the current example, Publisher A may be enabled to provide a search interface on his/her website that enables visitors to his/her website to search the restaurant reviews of "VegansOnline." Furthermore, embodiments enable the search index to be shared with other publishers, such that the other publishers can provide a search interface for the search index on their websites to receive queries from users.

Such embodiments have benefits. For instance, an owner of a website that is indexed may have increased traffic to their website, and enhanced visibility in search results pages. The publisher of the search interface for an index may obtain content for display on their website at relatively low cost, is provided with an indexing and crawling infrastructure, has access to a searchable ecosystem of feeds, has monetization opportunities for the displayed content (e.g., sponsored search), and access to search provider search branding. The provider of the indexing and crawling infrastructure (e.g., a central service, such as a conventionally available search engine provider, etc.) receives branding on publisher sites, may obtain revenue through sponsored search and/or usage fee revenue from publishers sites, receives access to web content, and receive highly structured, highly relevant content associated with searches (e.g., to use to learn about publishers, users, etc.).

Embodiments may be implemented in various embodiments. For instance, FIG. 1 illustrates an example environment in which publishers may generate searchable feeds based on selected websites. FIG. 1 shows a block diagram of an online system 100 in which such searchable feeds may be generated and accessed, according to an example embodiment. As shown in FIG. 1, system 100 includes first-third user devices 104a-104c, a searchable feed generating system 106, a plurality of content servers 112a-112n, and a plurality of publisher servers 122a-122n. In the embodiment of FIG. 1, content servers 112a-112n and publisher servers 122a-122n are included in the World Wide Web 102, although this is not necessary in all embodiments. System 100 is described as follows as an example environment for embodiments, but is not intended to be limiting.

First-third user devices 104a-104c, searchable feed generating system 106, content servers 112a-112n, and publisher servers 122a-122n are connected to a communication network 114. Network 114 may be any type of communication network, such as a local area network (LAN), a wide area network (WAN), or a combination of communication networks, and may include one or more wireless and/or wired links. Network 114 may include one or more routers, hubs, switches, bridges, etc., used to connect devices/networks and/or to forward data (e.g., data packets). In embodiments, network 114 may include the Internet and/or an intranet. Network 114 may enable RF (radio frequency) or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. User devices 104 can access content servers 112a-112n and publisher servers 122a-122n for content over network 114.

When signals are transmitted in signal packets in network 114, such signal packets may be compatible with or compliant with one or more protocols. Signaling formats or protocols employed may include, for example, TCP/IP, UDP, DECnet, NetBEUI, IPX, Appletalk, or the like. Example versions of the Internet Protocol (IP) may include IPv4 or IPv6.

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

User devices 104a-104c may each be any type of suitable electronic device, typically having a display and having web browsing capability (or other suitable network communication functionality), including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a smart phone (e.g., an Apple iPhone, a Google Android™ phone, a Microsoft Windows® phone, etc.), or other type of computing device. Although three user devices 104a-104c are shown in FIG. 1, any number of user devices 104 may be present in system 100 and coupled to network 114, including ones, tens, hundreds, thousands, millions, and even larger numbers of user devices 104.

In embodiments where network 114 includes the Internet, content (e.g., documents) of World Wide Web 102 is available for retrieval by user devices 104a-104c through network 114. On the Internet, content may be identified/located by a uniform resource locator (URL), such as http://www.documents.com/documentX, and/or by other mechanisms. User devices 104a-104c can access content through network 114 by supplying a URL corresponding to the content to a content server, such as one of content servers 112a-112n or publisher servers 122a-122n. Content servers 112a-112n each maintain and serve content. Publisher servers 122a-122n each may maintain and serve content, and may re-publish content of one or more of content servers 112a-112n.

For example, each of content servers 112a-112n and publisher servers 122a-122n may include a device that includes a configuration to provide content via network 114 to another device. A content server and a publisher server may each, for example, host a website, such as a social networking site, examples of which may include, without limitation, Flickr®, Twitter®, Facebook®, LinkedIn°, or a personal user site (such as a blog, vlog, online dating site, etc.). A content server and a publisher server may also each host a variety of other sites, including, but not limited to business sites, educational sites, dictionary sites, encyclopedia sites, wikis, financial sites, government sites, etc.

A content server and a publisher server may each further provide a variety of services that include, but are not limited to, web services, third-party services, audio services, video services, email services, instant messaging (1M) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

For instance, as shown in FIG. 1, content servers 112a-112n each host a corresponding one of websites 110a-110n, and publisher servers 122a-122n each host a corresponding one of websites 124a-124n. Websites 110a-110n and 124a-124n each provide content that is accessible to users of user devices 104a-104c. Websites 124a-124n may publish content of websites 110a-110n. For instance, in embodiments, websites 124a-124n may each provide a search interface for submitting search queries to a searchable index that indexes content of one or more of websites 110a-110n. Any number of content servers 112 and publisher servers 122 may be present in system 100 and coupled to network 114, including ones, tens, hundreds, thousands, millions, and even larger numbers of such servers.

As shown in FIG. 1, searchable feed generating system 106 is coupled to network 114. Searchable feed generating system 106 enables a publisher (e.g., a user that manages a website hosted by one or more of publisher servers 122a-122n) to configure a searchable feed for a selected website of content servers 112a-112n. For instance, as shown in FIG. 1, searchable feed generating system 106 may enable a publisher to generate an index 108, which is a searchable index of a selected website. Searchable feed generating system 106 may host the searchable feed, and may receive queries directed to the searchable feed from publisher servers 122a-122n and/or user devices 104a-104c. Searchable feed generating system 106 may apply the queries to index 108 to provide responses thereto.

For example, a publisher associated with publisher server 122a may access a user interface of searchable feed generating system 106 to indicate content of interest of website 110a hosted by content server 112a. As shown in FIG. 1, searchable feed generating system 106 may retrieve content 116 of website 110a from content server 112a. Searchable feed generating system 106 may generate index 108 as a searchable index for content 116. The publisher at publisher server 122a may configure website 124a to submit queries to index 108 at searchable feed generating system 106. For instance, a user at user device 104a may access a web page of website 124a (e.g., using a browser). The web page may provide a search interface into which the user may enter query terms, or the search interface may submit a query for the user automatically (e.g., based on profile information of the user, etc.). As shown in FIG. 1, a query 118 may be submitted to the search interface that includes one or more search terms, and that is transmitted from user device 104a to publisher server 122a. Publisher server 122a may receive query 118, and may forward query 118 to searchable feed generating system 106 with an identification of the searchable feed (e.g., index 108) as searchable feed query 120. Searchable feed generating system 106 may receive and apply searchable feed query 120 to index 108 to generate a searchable feed query response 126. Publisher server 122a may receive searchable feed query response 126, and may optionally add additional content to searchable feed query response 126 to generate query response 128. Query response 128 may be transmitted to user device 104a (e.g., in a file, a web page, a real simple syndication (RSS) feed, a widget, etc.) to be displayed by user device 104 to the user.

Searchable feed generating system 106 may be implemented in hardware, software, firmware, or any combination thereof. For example, searchable feed generating system 106 may include software/firmware that executes in one or more processors of one or more computer systems, such as one or more servers. Searchable feed generating system 106 may be implemented stand-alone, may be implemented at an online web portal such as Yahoo! (at http://www.yahoo.com), Bing™ (at http://www.bing.com), or Google™ (at http://www.google.com), or may be implemented elsewhere.

Figure 2:
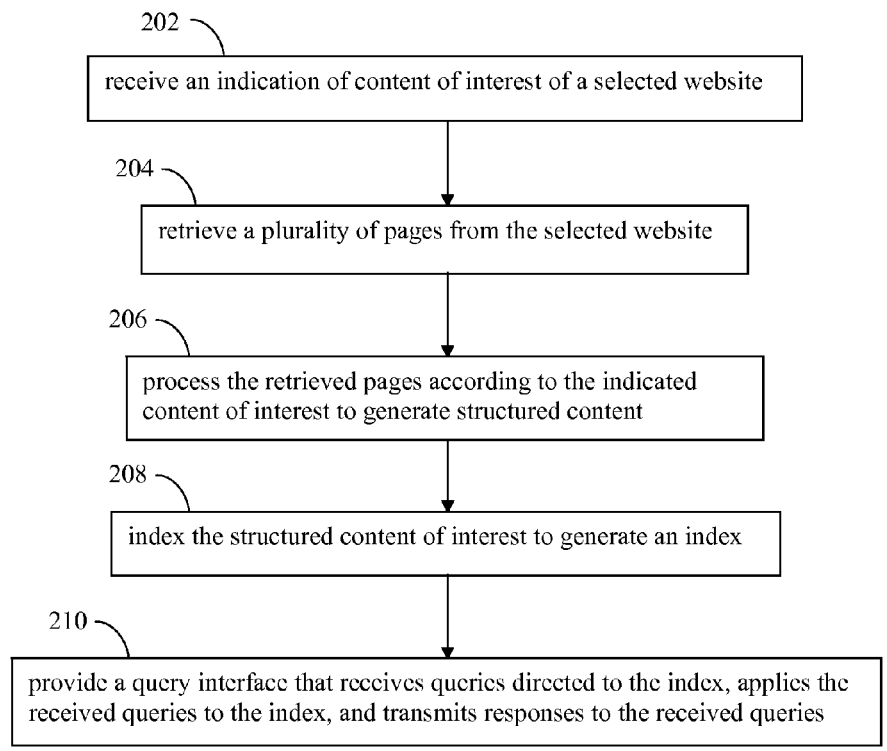
FIG. 2 shows a flowchart providing a process for generating and providing access to a searchable feed, according to an example embodiment.
Figure 3:
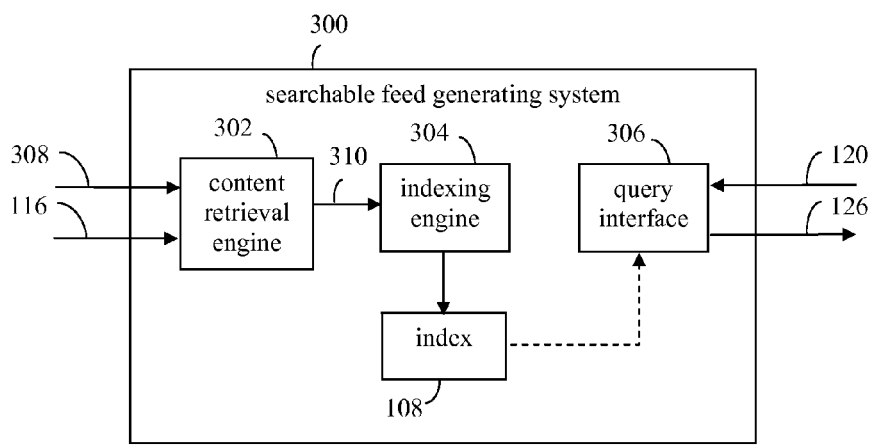
FIG. 3 shows a block diagram of a searchable feed generating system, according to an example embodiment.

In an embodiment, searchable feed generating system 106 of FIG. 1 may operate according FIG. 2. FIG. 2 shows a flowchart 200 providing a process for generating and providing access to a searchable feed, according to an example embodiment. For illustrative purposes, flowchart 200 is described as follows with respect to FIG. 3. FIG. 3 shows a block diagram of a searchable feed generating system 300, according to an example embodiment. Searchable feed generating system 300 is an example of searchable feed generating system 106 of FIG. 1. As shown in FIG. 3, of searchable feed generating system 300 includes a content retrieval engine 302, an indexing engine 304, and a query interface 306. Further structural and operational embodiments will be apparent to persons skilled in the relevant art(s) based on the following discussion regarding flowchart 200 and searchable feed generating system 300.

Flowchart 200 begins with step 202. In step 202, an indication is received of content of interest of a selected website. For example, as shown in FIG. 3, an indication 308 is received by content retrieval engine 302. Indication 308 may be received from a publisher (e.g., at a publisher server) and indicates content of interest to the publisher that is located at a website (e.g., hosted by a content server), such as a structure of how information is displayed by the website. In an embodiment, indication 308 may indicate a website of interest (e.g., by uniform resource locator (URL) or other website link or identifier), and may indicate content included in one or more pages of the website of interest. For instance, in one example, indication 308 may be provided by Publisher A described above (connoisseur of vegetarian food) indicating a website that provides reviews on vegetarian restaurants (e.g., www.veganonline.com), and may indicate restaurant review information at the website to be of interest. For instance, indication 308 may indicate a format or structure of how the website displays restaurant reviews (e.g., indicating one or more fields such as a restaurant title, description, price range, textual review, rating indication, etc.). Indication 308 may be provided in various forms, examples of which are described in further detail further below.

In step 204, a plurality of pages is received from the selected website. In an embodiment, content retrieval engine 302 may retrieve a plurality of web pages from the website indicated in indication 308 in various ways, such as by crawling the website. As shown in FIG. 3, content retrieval engine 302 retrieves content 116 (e.g., one or more web pages, etc.) from the selected website. Content retrieval engine 302 may be a proprietary web crawler or a commercially available web crawler, as would be known to persons skilled in the relevant art(s), or may be configured to retrieve content in other ways. Examples of content retrieval engine 302 configured to perform content retrieval are described in further detail further below.

In step 206, the retrieved pages are processed according to the indicated content of interest to generate structured content. In an embodiment, content retrieval engine 302 may process content 116 according to the indicated content of interest to generate structured content 310. For instance, structured content 310 may include structure (e.g., fields, etc.) from the pages of content 116 that was indicated in indication 308 as being of interest. The fields and/or other structure may be indicated in structured content 310 using tags and/or other structure identifiers. Examples of content retrieval engine 302 configured to generate structured content are described in further detail further below.

In step 208, the structured content of interest is indexed to generate an index. For instance, as shown in FIG. 3, indexing engine 304 receives structured content 310. In an embodiment, indexing engine 304 indexes structured content 310 to generate index 108. Index 108 may be a non-inverted (e.g., forward) or inverted index. Index 108 may be generated by indexing engine 304 according to proprietary or commercially available techniques, as would be known to persons skilled in the relevant art(s). For instance, in an embodiment provided for purposes of illustration, indexing engine 304 may generate index 108 to include a list of tokens (e.g., words) and a plurality of document-weight value pairs. Each token is a potential query term, and is a "key" to index 108. Each document-weight value pair includes a portion of the content of structured content 310 as the document (e.g., a URL) and includes a weight value corresponding to the document. In index 108, each token may have a corresponding list of one or more of the document-weight value pairs. As such, a query having one or more query terms may be applied to index 108, resulting in a list of ranked content being generated based on the document-weight value pairs that is ordered based on a ranking function. In other embodiments, index 108 may be structured in other ways, as would be known to persons skilled in the relevant art(s). Examples of indexing engine 304 are described in further detail further below.

In step 210, a query interface is provided that receives queries directed to the index, applies the received queries to the index, and transmits responses to the received queries. For example, in an embodiment, query interface 306 may receive queries that are directed to index 108 (and/or optionally to further indexes). As shown in FIG. 3, query interface 306 receives searchable feed query 120 from a requester, which includes one or more query terms (e.g., words). Query interface 306 may apply the query terms of searchable feed query 120 to index 108 to generate query results. For instance, as described above, a list of ranked content may be generated by applying the query terms to index 108. The query terms may be used as keys to index 108, such that document-weight value pairs corresponding to tokens matching the query terms are selected. These document-weight value pairs may be processed to generate the ranked list of content. Query interface 306 transmits the query results to the requester in searchable feed query response 126. Query interface 306 may be implemented in various ways, including as an application programming interface (API), a web service, etc. Examples of query interface 306 are described in further detail further below.

Searchable feed generating systems may be configured in various ways to perform their functions. Example embodiments for searchable feed generating systems and further embodiments are described in the following subsections.

A. Example Embodiments for Indicating Content of Interest

Figure 4:
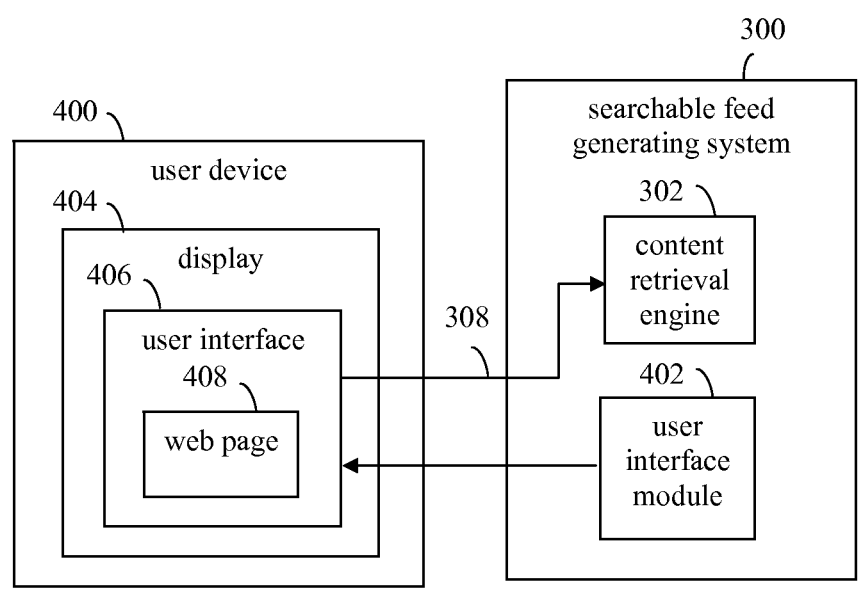
FIG. 4 shows a block diagram of searchable feed generating system configured to provide a user interface for indicating content of interest for a searchable feed, according to an example embodiment.

A searchable feed generating system may be configured in various ways to perform step 202 of FIG. 2. For instance, FIG. 4 shows a block diagram of searchable feed generating system 300 configured to provide a user interface for indicating content of interest for a searchable feed, according to an example embodiment. As shown in FIG. 4, searchable feed generating system 300 includes content retrieval engine 302 and a user interface module 402. User interface module 402 is configured to generate a user interface that a user can interact with to configure a searchable feed by indicating a website and content of interest.

For example, as shown FIG. 4, user interface module 402 may generate a user interface 406 that is displayed by a display 404 of a user device 400. User device 400 is an example of one of user devices 104a-104c in FIG. 1. In an embodiment, user interface module 402 may generate user interface 406 as a web page or other web object that is displayed in a browser of user device 400. User interface 406 may enable a user (e.g., a publisher, editor, and/or developer) to view one or more web pages of a website of interest to the user, and to mark the web page(s) to indicate content of interest of the website that the user desires to make accessible on another website. For instance, the user may be enabled to mark sample web pages of a website hosted by a content server. The sample web pages may be selected from the website by the user as generally representative of the structure of the website. The user may be enabled to mark any portions of the content displayed on the sample web pages to indicate a structure (e.g., a URL structure) of the desired content of the website.

Figure 5:
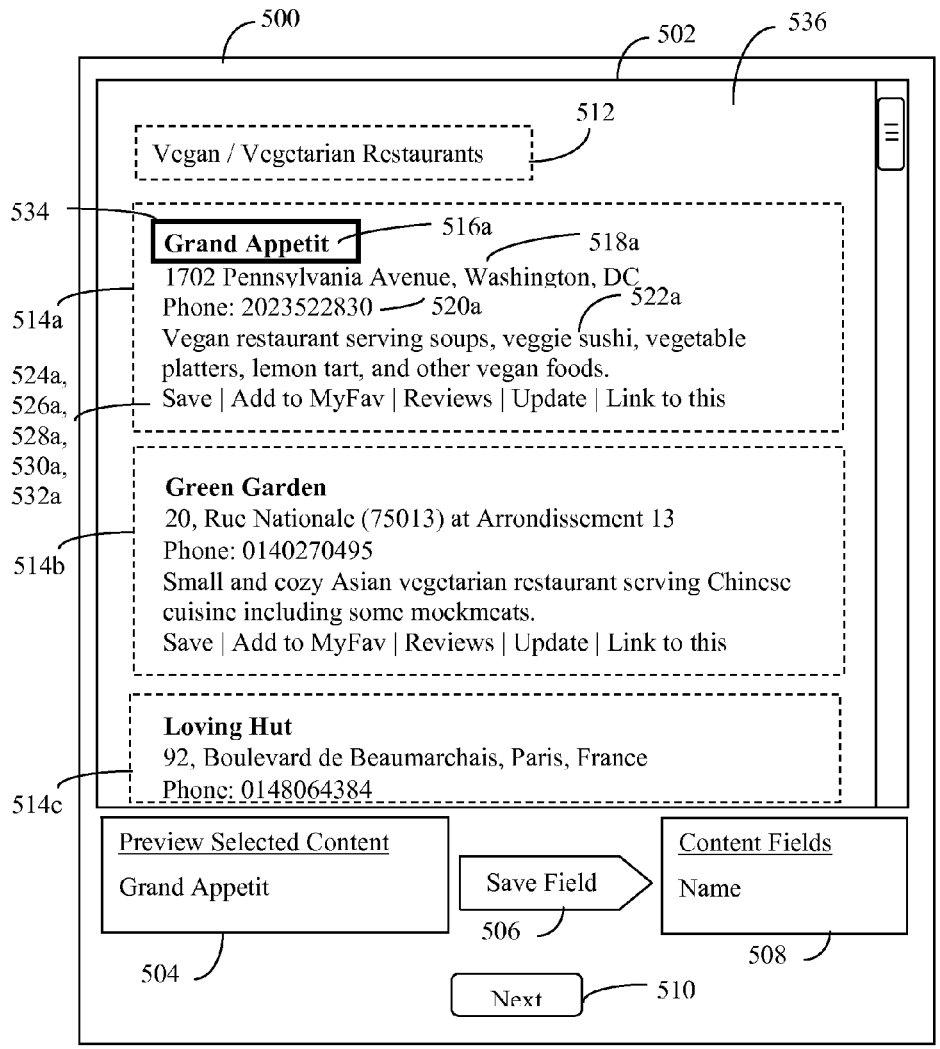
FIG. 5 shows a sample web page being marked to indicate content of interest for a searchable feed, according to an example embodiment.

For instance, FIG. 5 shows a user interface 500 configured to display and mark a sample web page to indicate content of interest for a searchable feed, according to an example embodiment. In an embodiment, user interface 500 may be generated by user interface module 402 of FIG. 4, and displayed at user device 400 in a browser. As shown in FIG. 5, a sample web page may be displayed in a marking window 502 of user interface 500. A user may of user interface 500 may be enabled to navigate to a sample web page to have the sample web page presented in marking window 502. Furthermore, the user may be enabled to interact with the sample web page in marking window 502 to indicate a structure of sample web page, and to indicate content of interest of the sample web page. Any number of web pages of the website may be marked in this manner to indicate a structure of the website and to indicate content of interest.

As shown in FIG. 5, user interface 500 further includes a preview selected content list 504, a save field button 506, a content fields list 508, and a next button 510. The user may use a mouse pointer or other user interface element to select a displayed element of a sample web page, such as a title, header, name, description, contact information (phone number, cell phone number, instant messaging address, mailing address, email address, etc.), one or more links, and/or any further displayed fields or elements to indicate a structure of the page. An identifier for the selected element is displayed in preview selected content list 504, and by selecting save field button 506 (e.g., by a mouse pointer click or other action), the selected element may be listed in content fields list 508. The user may be enabled to input a textual name for the selected element, which appears in content fields list 508. The user may select additional fields/elements of the web page in this manner to have them listed in contents fields list 508 to identify the structure of the sample web page. When the user has listed all of the elements of interest of the web page in content fields list 508, the user may select next button 510 to save the list, to optionally mark a next web page of the website, and to indicate that marking the content of interest of the website is complete.

For instance, in FIG. 5, a sample web page 536 is displayed in marking window 502. User interface 500 enables sample web page 536 to be marked to indicate content of interest for a searchable feed. As shown in FIG. 5, sample web page 536 includes a title element 512 and a plurality of restaurants 514a-514c (additional restaurants may be present that are not visible in FIG. 5, but that may be viewed by scrolling downward in marking window 502). Each of restaurants 514a-514c includes a common structure. For instance, restaurant 514a is shown including a name field 516a, an address field 518a, a phone number field 520a, a description field 522a, a save link 524a, an "Add to MyFav" link 526a, a "Reviews" link 528a, an update link 530a, and a "Link to this" link 532a. Restaurants 514b and 514c include a same structure as restaurant 514a. A user of user interface 500 can select any of these fields/links of sample web page 536 to have them listed in preview selected content list 504, and can select save field button 506 to have the field/link included in content fields list 508 to indicate the structure of sample web page 536.

For instance, as shown in FIG. 5, a user has selected name field 516a (having a value of "Grand Appetit") of restaurant 514a, as indicated by box 534 shown around selected name field 516a. As a result, the value of selected name field 516a appears in preview selected content list 504. In an embodiment, because the user selected name field 516a in restaurant 514a, each name field in restaurants 514b and 514c may also appear selected (e.g., by a corresponding box, etc.) because these fields have a common structure (e.g., are indicated by a common tag, such as "restaurant name") in the underlying code for sample web page 536. In other words, when name field 516a is selected, user interface 500 may search the underlying code for sample web page 536 (e.g., HTML code, XML code, etc.) for a tag for name field 516a. After the tag for name field 516a is determined, all displayed fields/links having a same tag as name field 516a may be indicated as selected. If some displayed fields/links are erroneously indicated as selected by user interface 500, the user may be enabled to de-select those particular fields/links. In this manner, a structure of sample web page 536 is determined and recorded.

Note that the embodiments of user interface 500 and sample web page 536 shown in FIG. 5 and described above are provided for purposes of illustration, and are not intended to be limiting. User interface 500 can be configured in various ways, with various numbers, types, and positions of user interface elements (e.g., text entry boxes, pull down menus, pop-up menus, buttons (e.g., single buttons, radio buttons, etc.), check boxes, etc.) to enable marking of a sample web page. Any type of sample web page, similar to or different from sample web page 536, may be marked using user interface 500. Furthermore, user interface module 402 may be implemented in any manner to perform its functions. An example embodiment for user interface module 402 is the Dapper™ tool provided at open.dapper.net by Yahoo! Inc., which enables users to mark web pages for information to be retrieved from websites.

B. Example Embodiments for Retrieving Content of Interest

Figures 6, 7:
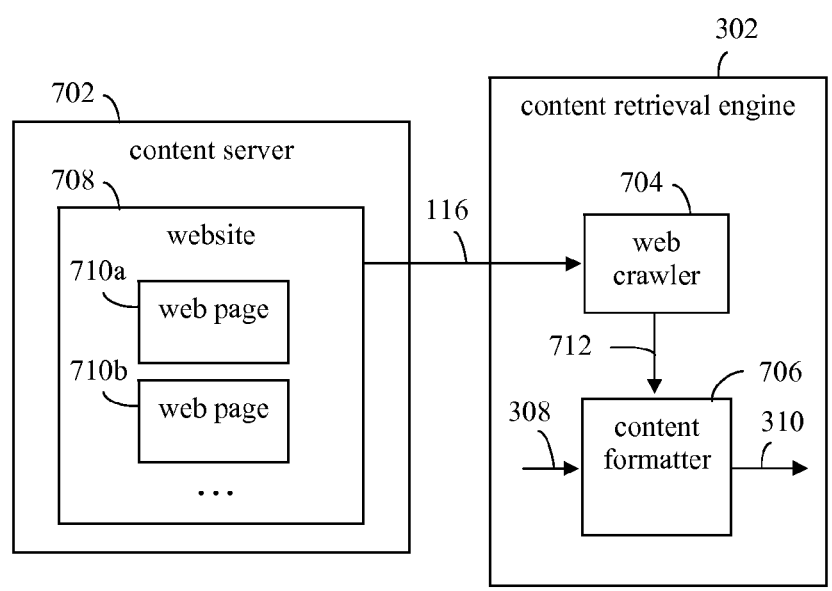
FIG. 6 shows a process for retrieving content from a selected website, according to an example embodiment.
FIG. 7 shows a block diagram of a content retrieval engine that crawls a website for content, according to an example embodiment.

Content retrieval engine 302 of FIG. 3 may be configured in various ways to perform steps 204 and 206 of FIG. 2. For instance, FIG. 6 shows a step 602 providing a process for retrieving content from a selected website, according to an example embodiment. In an embodiment, content retrieval engine 302 may perform step 602. Step 602 is described as follows with respect to FIG. 7. FIG. 7 shows a block diagram of content retrieval engine 302 and a content server 702, according to an example embodiment. Content server 702 is an example of one of content servers 112a-112n of FIG. 1. As shown in FIG. 7, content retrieval engine 302 includes a web crawler 704 and a content formatter 706. Further structural and operational embodiments will be apparent to persons skilled in the relevant art(s) based on the discussion regarding step 602 and content retrieval engine 302 of FIG. 7.

In step 602, the selected website is crawled to retrieve the plurality of web pages. In an embodiment, referring to FIG. 7, web crawler 704 may be configured to crawl the website selected by the user (e.g., in step 202 of FIG. 2 described above) to retrieve one or more web pages of the website. For example, as shown in FIG. 7, web crawler 704 may crawl a website 708 hosted by content server 702. Web crawler 704 may download one or more web pages from website 708, such as web pages 710a, 710b, and additional web pages as content 116. As shown in FIG. 7, web crawler 704 outputs received content 116 as downloaded content 712.

Web crawler 704 may be configured to perform website crawling in various ways, as would be known to persons skilled in the relevant art(s). For instance, web crawler 704 may communicate with a variety of content servers, such as content servers 112a-112n, via network 114. In some embodiments, web crawler 704 may start with a list of one or more URLs of a website to visit. The list may be referred to as the seed list. As web crawler 704 visits each URL in the seed list, web crawler 704 may identify the hyperlinks (for documents/files) in the corresponding web page file and add the hyperlinks to a list of URLs to visit, which may be referred to as the crawl frontier. URLs from the crawl frontier may be recursively visited according to a set of policies. Web crawler 704 may retrieve files by generating a copy to be stored in storage, such as local cache storage associated with searchable feed generating system 300 ("cache storage" may refer to a persistent storage device). Web crawler 704 may likewise follow links, such as HTTP (hypertext transfer protocol) hyperlinks, in the retrieved files to additional files and may retrieve those files by generating copies for storage, and so forth. Web crawler 704 may therefore retrieve files from one or more content servers as it "crawls" a website. Web crawler 704 may perform a crawl job for a particular publisher at the time the selected website is provided, may add the crawl job to a queue of crawl jobs for crawl scheduling, or may perform the crawl job at any other time and/or in any other manner.

Referring back to FIG. 2, in step 206, the retrieved pages are processed according to the indicated content of interest to generate structured content. As shown in FIG. 7, in an embodiment, content formatter 706 receives downloaded content 712, and structures downloaded content 712 according to the structure indicated in indication 308. As shown in FIG. 7, structured content 310 is output by content formatter 706. Structured content 310 may include particular fields/elements from each page in downloaded content 712 that are indicated with structure, such as tags (e.g., "anchor tags" that anchor a URL to some text in a web page, "div tags" that define a section in an HTML document, and/or further types of HTML tags, etc.), to identify the fields/elements. Structured content 310 may be generated as one of more files, feeds, or other data structures that include the content of interest in any form, such as in a human readable textual form, in the form of an RSS or other type of feed, in the form of a programming code or language, such as XML (extensible markup language), HTML, etc., and/or in other form.

For instance, in the above example of restaurant reviews, web crawler 704 may crawl the website "VeganOnline" to retrieve one or more web pages of the website. Content formatter 706 may receive the web pages from web crawler 704 as downloaded content 712. Content formatter 706 may parse the web pages for the content of interest indicated in indication 308. For example, content formatter 706 may extract sections of content from the web pages that occur repeatedly, as indicated by a "div tag" or other indication. In the restaurant example, each restaurant that is mentioned in the web pages may be indicated by a restaurant "div tag." Fields for each restaurant, such as restaurant name (e.g., name field 516a), restaurant address (e.g., address field 518a), etc. may be indicated. Each indicated section (e.g., restaurant), and its corresponding fields, may be extract from the web pages in the form of key-value pairs (e.g., field name and field value) and included in structured content 310 (which may be a file, a feed, or other object). The sections and fields may each be indicated in structured content 310 by corresponding tags (e.g., "div tags," "anchor tags," etc.). In this manner, structured content 310 includes the content of interest of downloaded content 712, and indicates the structure of the content of interest (e.g., in the form of tags that indicated structure, such as "div tags", etc.). The remaining portions of downloaded content 712 that are not extracted by content formatter 706 may be discarded.

Note that the embodiments of content retrieval engine 302 shown in FIG. 7 and described above are provided for purposes of illustration, and are not intended to be limiting. Content retrieval engine 302 can be configured in other ways as would be apparent to persons skilled in the relevant art(s) from the teachings herein.

C. Example Embodiments for Indexing Retrieved Content

Figure 8:
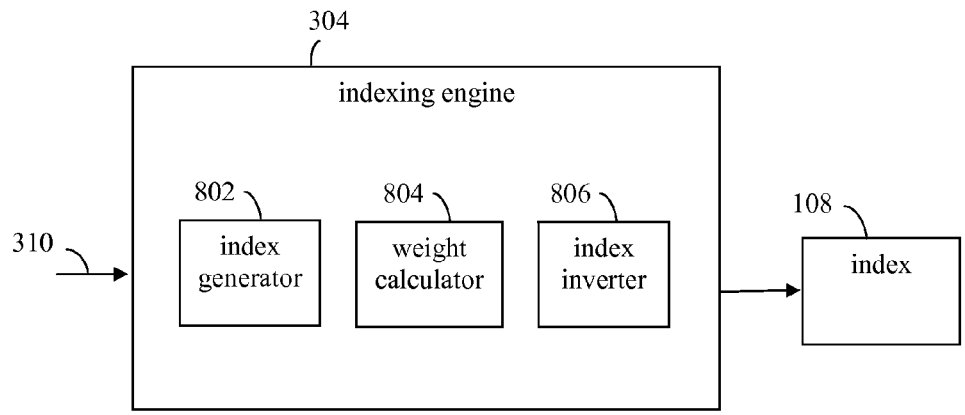
FIG. 8 shows a block diagram of an indexing engine, according to an example embodiment.

Indexing engine 304 may be configured in various ways to perform step 208 of FIG. 2. For instance, FIG. 8 shows a block diagram of indexing engine 304, according to an example embodiment. As shown in FIG. 8, indexing engine 304 includes an index generator 802, a weight calculator 804, and an index inverter 806. Index generator 802 receives structured content 301. Structured content 310 may be received from content retrieval engine 302 in the form of one or more documents containing program code (e.g., HTML, XML, etc.). Index generator 802 may parse structured content 310 to remove unnecessary characters, and to determine information to be indexed. For instance, index generator 802 may identify tokens in structured content 310 and URLs (e.g., documents) to be indexed.

As such, in an embodiment, index generator 802 may generate index 108 to include a list of documents, and for each document, may list the tokens included in the document. Index 108 having such an organization may be referred to as forward index. In an embodiment, index inverter 806 may optionally be present, and may invert the forward index to generate index 108 as a reverse index. In such an embodiment, index 108 may include a list of tokens, and for each token, may list each of the documents in which the token is included. Still further, in an embodiment, weight calculator 804 may generate a weight value for each document listed for a token and/or may generate a weight value for each portion of a document (e.g., for each tagged field of the document) to generate a plurality of document-weight value pairs and/or document field-weight value pairs for each token. The weight value for an item indicates a relevance of the item to the token. Such weight values may be generated by weight calculator 804 in any way, as would be known to persons skilled in the relevant art(s) (e.g., by frequency of the token in the section, by position of the token in the section, etc.).

For instance, in the above example of restaurant reviews, index generator 802 may generate index 108 to include a plurality of documents, where each document represents a corresponding restaurant (e.g., as determined by the "div tags" and/or by other mechanism). Furthermore, each listed restaurant may have a list of key-value pairs, representing the fields of the restaurant (e.g., title, description, etc.) and their values. Each key-value pair may be assigned a corresponding weight value. For instance, each title-value pair may be weighted higher relatively to each description-value pair, etc. Thus, in one example embodiment, index 108 may be generated to include a list of tokens, and for each token, there may be a list of one or more documents representing restaurants, with each restaurant having a plurality of key value pairs. When a query is applied to index 108, the documents listed for the tokens of the query may be processed to determine a weight for each document (e.g., determining a weight for each restaurant) based on some combination of the weights assigned to the key-value pairs of the document. The documents (e.g., restaurants) with the highest determined weights may be have the highest rankings for the query, and may be provided in response to the query in a ranked order.

Note that in an embodiment, a user (e.g., the publisher, developer, editor, etc.) that indicated the content of interest of the website (in step 202 of FIG. 2) may provide an indication of a type or category of the content of interest. For instance, in the example of restaurant reviews, the content of interest obtained from the "VeganOnline" website may be categorized as location information because restaurants and their locations are identified. Such a data category may be used by index generator 802 to optimize generation of index 108 in a manner as would be known to persons skilled in the relevant art(s).

In a further embodiment, indexing engine 304 may be configured to combine indexes together. For instance, multiple indexes may be generated that correspond to multiple different websites that contain similar content. The multiple indexes may be combined together into a combined index, and received queries may be applied to the combined index to generate query results based on the contents of the multiple websites.

Figure 9:
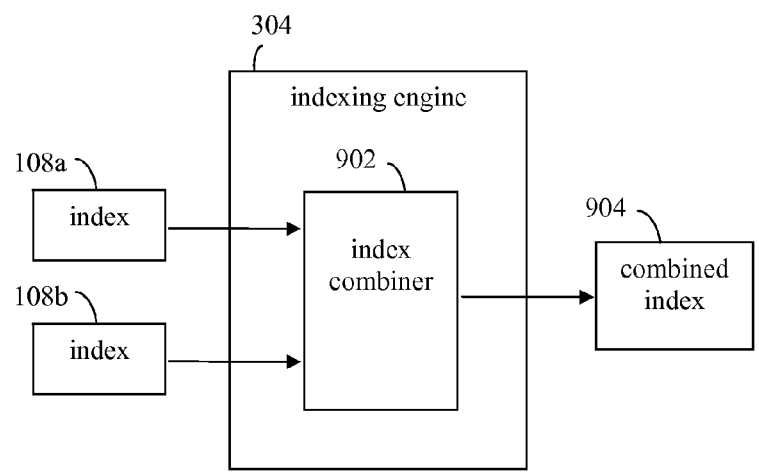
FIG. 9 shows a block diagram of an indexing engine configured to combine multiple indexes, according to an example embodiment.

For instance, FIG. 9 shows a block diagram of indexing engine 304 configured to combine multiple indexes, according to an example embodiment. As shown in FIG. 9, indexing engine 304 includes an index combiner 902. Index combiner 902 receives first and second indexes 108*a* and 108*b*. First index 108*a* may have been generated by indexing engine 304 based on content retrieved from a first website, and second index 108*b* may have been generated by indexing engine 304 based on content retrieved from an additional, second website. Index combiner 902 combines first and second indexes 108*a* and 108*b* to generate a combined index 904. Combined index 904 may be an inverted or non-inverted index, and may have a similar format as index 108 described above, or a different format. Index combiner 902 may combine indexes 108*a* and 108*b* in any manner, such as by a merge. For instance, to generate a combined forward index from a pair of forward indexes, entries of second index 108*b* that are not present in first index 108*a* may be identified and added to first index 108*a*. This combined forward index may be inverted to generate a combined inverted index. Alternatively, to generate a combined inverted index directly from a pair of inverted indexes, entries of second index 108*b* that are not already present in first index 108*a* may be added first index 108*a* for the appropriate tokens.

Note that the embodiments of indexing engine 304 shown in FIGS. 8 and 9 and described above are provided for purposes of illustration, and are not intended to be limiting. Indexing engine 304 can be configured in other ways as would be apparent to persons skilled in the relevant art(s) from the teachings herein.

D. Example Embodiments for Processing Queries

Figure 10:
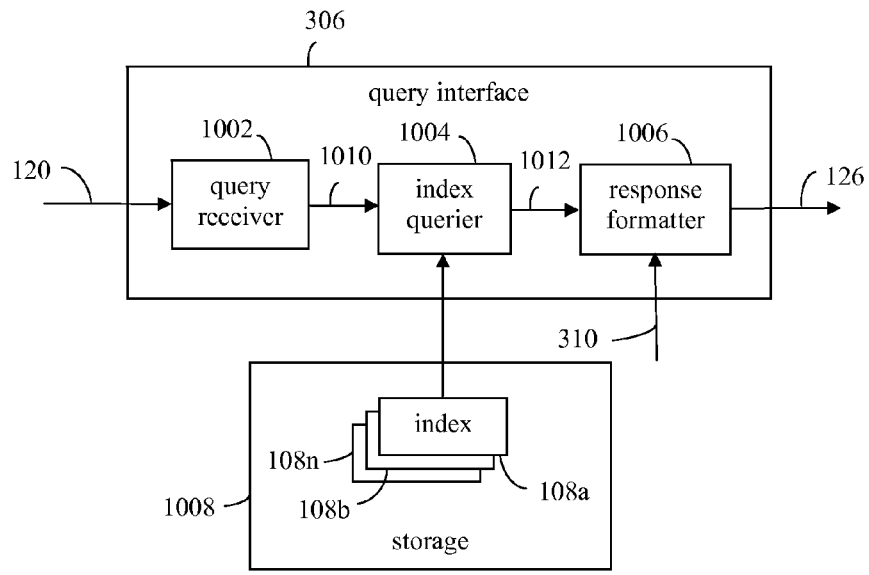
FIG. 10 shows a block diagram of a query interface for processing queries, according to an example embodiment.

Query interface 306 may be configured in various ways to perform step 210 of FIG. 2. For instance, FIG. 10 shows a block diagram of query interface 306 coupled to storage 1008, according to an example embodiment. As shown in FIG. 10, query interface 306 includes a query receiver 1002, an index querier 1004, and a response formatter 1006. Query receiver 1002 is configured to receive queries directed to indexes supported by query interface 306, such as indexes 108*a*-108*n* stored in storage 1008. Any number of indexes may be stored in storage 1008 that are supported by query interface 306, including tens, hundreds, thousands, and even greater numbers of indexes. Storage 1008 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Figure 11:
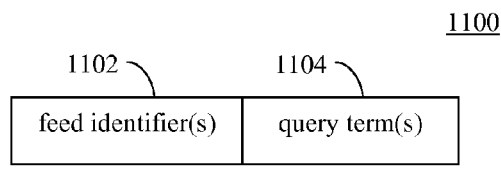
FIG. 11 shows an example query that may be submitted by a user to a publisher site, according to an embodiment.

Query receiver 1002 may be configured to parse a received query, such as searchable feed query 120, to determine the one or more indexes that the query is directed to, and to determine the one or more query terms included in the query. For instance, FIG. 11 shows an example query 1100 that may be submitted by a user to a publisher site, and forwarded to query interface 306, according to an embodiment. Query 1100 includes one or more feed identifiers 1102 and one or more query terms 1104. Feed identifier(s) 1102 includes the identifiers for the feeds/indexes to which query 1100 is directed. Query term(s) 1104 includes the query term(s) of query 1100. Any number of feed identifiers may be included in feed identifiers 1102, and any number of query terms may be present in query terms 1104. For instance, a query including the following three query terms of "1989," "red," and "corvette" may be directed to a "Classic Cars" feed having an associated index at stored in storage 1008. Query receiver 1002 may parse query 1100 to determine the one or more feed identifiers 1102 and one or more query terms 1104, which are output from query receiver 1002 as parsed query 1010.

As shown in FIG. 10, index querier 1004 receives parsed query 1010. Index querier 1004 applies the query term(s) of parsed query 1010 to the index(es) in storage 1008 corresponding to the feed identifier(s) of parsed query 1010 to generate a query response. The query response includes a list of ranked documents (e.g., URLs). For instance, as described above, index 108 may include indexes entries that are each assigned a value referred to as a weight. A query term applied to index 108 may correspond to an index entry. The query response may be ranked by scoring files or records located in index 108, such as in accordance with number of times a query term occurs weighed in accordance with a weight assigned to an index entry corresponding to the query term. Other aspects may also affect ranking, such as a proximity of query terms within a located record or file, or semantic usage, for example. A score and an identifier for a located record or file, for example, may be stored in a respective entry of a ranking list. A list of query results may be ranked in accordance with scores, which may be provided in response to the query. In some embodiments, machine-learned ranking (MLR) models may be used to rank search results. MLR is a type of supervised or semi-supervised machine learning problem with the goal to automatically construct a ranking model from training data. In other embodiments, other ranking techniques may be used, as would be known to persons skilled in the relevant art(s). As shown in FIG. 10, index querier 1004 generates query results 1012.

As shown in FIG. 10, response formatter 1006 receives query results 1012, and formats query results 1012 to generate searchable feed query response 126. For example, in an embodiment, response formatter 1006 may format query results 1012 to include fields and/or other information indicated in structured content 310, generating searchable feed query response 126 to include these fields and/or other information. Searchable feed query response 126 is transmitted to the publisher server or other entity that provided searchable feed query 120.

Figure 12:
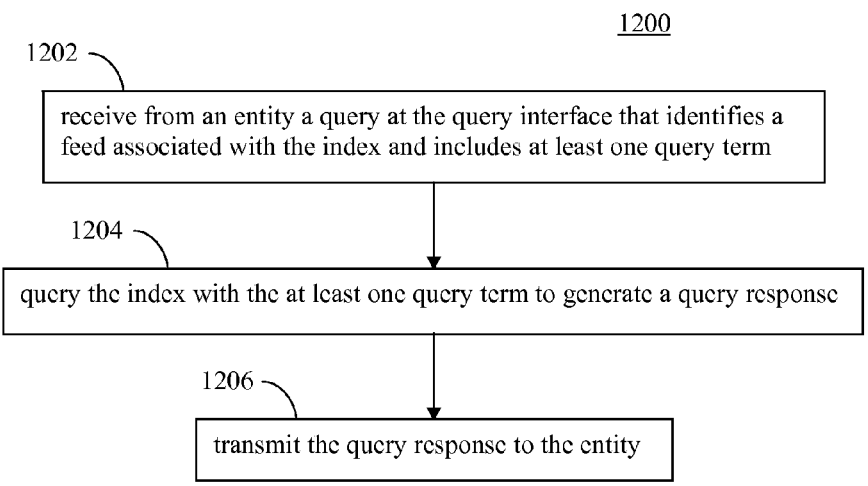
FIG. 12 shows a flowchart providing a process for processing a received query, according to an example embodiment.

Thus, in an embodiment, query interface 306 may operate according to FIG. 12. FIG. 12 shows a flowchart 1200 providing a process for processing a received query, according to an example embodiment. Further structural and operational embodiments will be apparent to persons skilled in the relevant art(s) based on the following discussion regarding flowchart 1200.

Flowchart 1200 begins with step 1202. In step 1202, a query is received from an entity at the query interface that identifies a feed associated with the index and includes at least one query term. For example, as described above, a user may submit a query (e.g., query 118 of FIG. 1) at a user device to a search interface of a publisher website (e.g., hosted by website 124a at publisher server 122a of FIG. 1). The publisher website may forward the query to be received by query receiver 1002 at query interface 306 (e.g., as searchable feed query 120). Alternatively, the query may be received by query receiver 1002 directly from the user (e.g., not through an intermediate publisher server). The query may identify one or more feeds and one or more query terms, similarly to query 1100 shown in FIG. 11.

In one example, a publisher server may have a website (e.g., "FoodReview" at www.foodreview.com) that provides a search interface for restaurant reviews provided at the above mentioned content server-hosted website "VeganOnline". The search interface at the publisher website (e.g., "FoodReview") may enable queries to be provided to a searchable feed (e.g., generated from the website "VeganOnline") at a searchable feed generating system identified as "VeganOnlineRestaurants." An example query directed to the feed that may be input by a user may include the following information:

Query Terms: Asian, Paris, France

For instance, in the example, the user may desire to locate vegetarian Asian restaurants in Paris, France. As such, the user may provide the above query terms. Furthermore, the search interface may associate an identification of the feed with the query terms, to be transmitted to the query interface of the searchable feed generating system, as shown as follows:

Feed Identifier: VeganOnlineRestaurants

Query Terms Asian, Paris, France

By including the feed identifier of "VeganOnlineRestaurants," query interface 306 can identify the appropriate index in storage to which to apply the query terms. Still further, the search interface may optionally be configured by the publisher to include one or more additional query terms with the query, if desired (e.g., to perform a more tailored search than would be performed based on the user query terms alone).

Referring back to FIG. 12, in step 1204, the index is queried with the at least one query term to generate a query response. As described above with respect to FIG. 10, index querier 1004 applies the query term(s) of parsed query 1010 to the appropriate index in storage 1008 to retrieve and generate query results 1012 (e.g., a list of documents). Index querier 1004 may order the query results according to a ranking.

Continuing the above example, index querier 1004 may apply the received query terms of "Asian," "Paris," and "France" to index 108a (in this example, index 108a corresponds to the identified feed of "VeganOnlineRestaurants"). Index querier 1004 may generate query results that include a list of restaurants that best match the received query terms, and which may be ranked in terms of the best match (first) to the worst match (last). For example, the following query results may have been generated:

www.GreenGarden.com www.Loving Hut.com

. . .

(For ease of illustration, two entries are shown in the above example list of query results, although greater numbers of query results entries may have been generated.)

Referring back to FIG. 12, in step 1206, the query response is transmitted to the entity. As described above with respect to FIG. 10, response formatter 1006 receives and formats query results 1012, and transmits the formatted query results as searchable feed query response 126. Response formatter 1006 may format the query results 1012 in any manner, such as by including associated fields and/or other information from structured content 310 with each result entry.

Continuing the above example, response formatter 1006 may apply information collected in structured content 310 to each of the query results received for the query terms of "Asian," "Paris," and "France" applied to index 108a. For example, the following formatted query results may be generated, where various fields marked in sample web page 536 may be included with each query result entry:

Name: Green Garden website: www.GreenGarden.com

Address: 20, Rue Nationale (75013) (at Arrondissement 13, Metro: Porte d'Ivry)

Phone Number: 0145829954

Description: Small and cozy Asian vegetarian restaurant serving Chinese cuisine including some mockmeats. Operated by a meditation group who are strict vegetarians. Reported to have become all vegan since summer 2009. Call for hours. There is a health food store next door.

Review Ranking of 3 Stars

First Review: "Pretty OK mostly vegan Chinese." The menu is full of familiar favorites—fried noodles, spring rolls, and lots of tofu and fake-meat dishes served either in a "marmite" (small covered clay pot) or in a standard dish. If you want dim sum, get there early; they stop serving it around 1 p.m.

Name: Loving Hut
website: www.Loving Hut.com
Address: 92, Boulevard de Beaumarchais (75011) (at Train: Saint-Sébastien Froissard/Line 8)
Phone Number: 0148064384
Description: Paris vegan restaurant opened in 2009. Part of international chain of vegan restaurants opened by followers of Supreme Master Ching Hai, an advocate for vegetarian living. Serving Asian and French food, coffee, non-alcoholic beverages, and more. Accepts credit cards. Open Mon-Thur 12 noon-3 pm and 6:30 pm-10 pm, Fri-Sat 12 noon-3 pm and 7 pm-10:30 pm, closed Sun.
Review Ranking of 4 Stars
First Review: "Not even close to other Loving Huts." Can't agree with the positive reviews on here unfortunately. This has been an awful experience. Apart from the obvious weirdness of this place like the Supreme Master TV spots shown on TV all the time like in any other Loving Hut this is definitely not a place to visit while you're in Paris—there are simply so many better places to eat vegan food.
. . .

Accordingly, searchable feed query response 126 may be generated to include the query results formatted to include structure defined by the publisher, and may be transmitted to the publisher server. As described further below, the publisher server may forward searchable feed query response 126 "as is" to the user device that submitted the original query, or may add additional content to the query response.

As described above, combined indexes may be generated by combining multiple indexes. Indexes 108a-108n shown in FIG. 10 may include any number of combined indexes, and queries may be directed to such combined indexes in any manner. For instance, a combined index may be indicated in a query (e.g., in feed identifier(s) 1102) by the publisher server that receives a query from a user, or in other manner. Furthermore, when query interface 306 receives a query that indicates multiple feed identifiers, query interface 306 may apply the query term(s) of the query separately to each of the corresponding indexes, and may generate a separate query response for each of the feed identifiers. Alternatively, query interface 306 may generate a single query response that includes query response information for all of the feed identifiers together.

Note that the embodiments of query interface 306 shown in FIG. 10 and described above are provided for purposes of illustration, and are not intended to be limiting. Indexing engine 304 can be configured in other ways as would be apparent to persons skilled in the relevant art(s) from the teachings herein.

E. Example Embodiments for Publisher Servers

Figure 13:
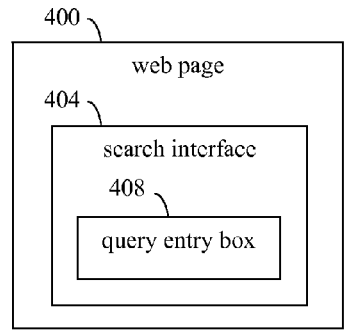
FIG. 13 shows a block diagram of a web page that provides a search interface for providing queries to a searchable feed, according to an example embodiment.

As described above, a publisher server may host a website that includes a search interface for accessing a searchable feed. For instance, as shown in FIG. 1, publisher servers 122a-122n each host a corresponding one of websites 124a-124n. Each of websites 124a-124n may include a web page that may be navigated to by a user using a browser at a user device (e.g., one of user devices 104a-104c). The web page may include a search interface that a user may interact with to input a query to a searchable feed. For instance, FIG. 13 shows a block diagram of a web page 400 that provides a search interface 404, according to an example embodiment. A user may interact with search interface 404 to input query terms to be submitted to a searchable feed. Search interface 404 may be provided in any manner, including as a form displayed in web page 400, a widget displayed in web page 400, or in any other manner. For example, as shown in FIG. 13, query entry box 408 may include a query entry box 408 into which the user can enter (e.g., type in) one or more query terms to be submitted as a query (e.g., by clicking on a "submit" button). In other embodiments, search interface 404 may provide one or more alternative user interface elements that enable a user to input a query to a searchable feed.

Upon submitting the query to search interface 404, as described above, the query is provided to a searchable feed associated with search interface 404. For instance, the query may be received at a query interface that applies the query to an index associated with the searchable feed. The query interface generates a query response for the searchable feed that is provided to the publisher server to be provided to the user that submitted the query.

Figure 14:
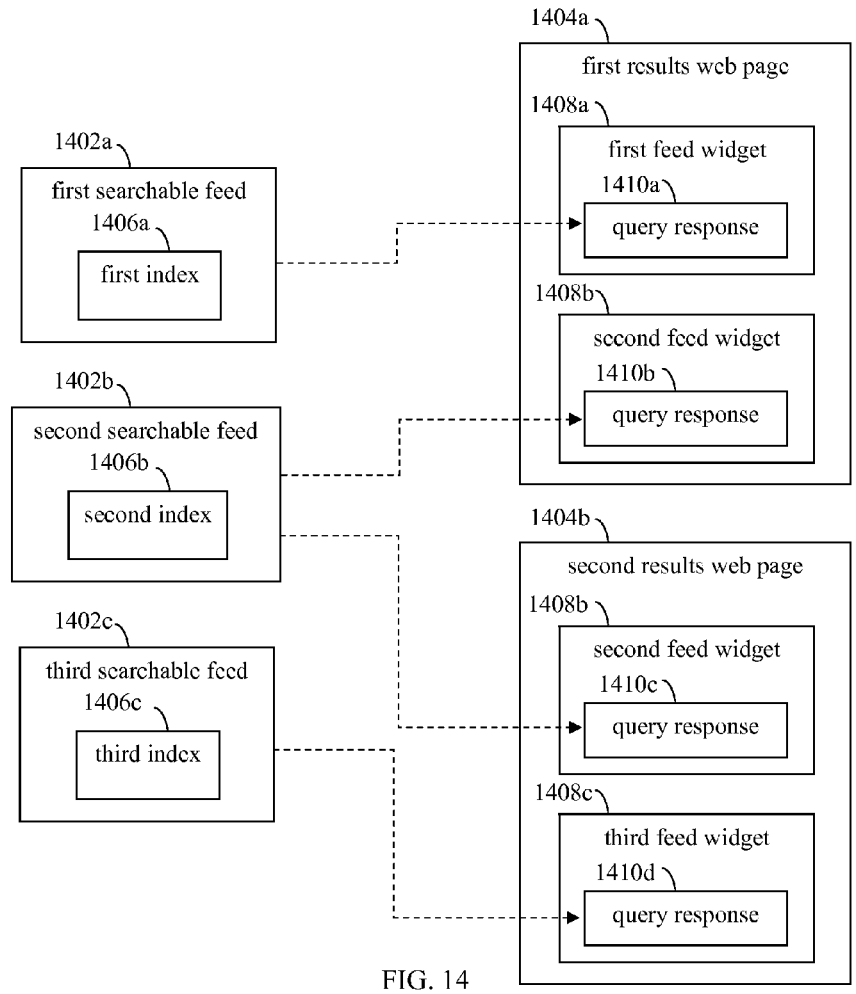
FIG. 14 shows a block diagram of query responses being provided from a plurality of searchable feeds to a plurality of publisher query results pages, according to an example embodiment.

Note that any number of user devices may include any number of search interfaces 404 for submitting queries to any number of searchable feeds. Furthermore, search interfaces 404 may be configured to display query responses received from the searchable feeds. For example, FIG. 14 shows a block diagram of query responses being provided from a plurality of searchable feeds for display in a plurality of publisher query results pages, according to an example embodiment. In FIG. 14, first-third searchable feeds 1402a-1402c are present, each having an associated one of indexes 1406a-1406c. First-third searchable feeds 1402a-1402c may be accessed at a same query interface (e.g., query interface 306) or at different query interfaces (query interfaces are not shown in FIG. 14 for ease of illustration). Furthermore, first and second results web pages 1404a and 1404b are shown that are provided by respective publisher servers to be displayed at respective user devices that submitted queries.

For instance, first results web page 1404a displays first and second feed widgets 1408a and 1408b. First feed widget 1408a enables queries to be submitted to and received from first searchable feed 1402a, and second feed widget 1408b enables queries to be submitted and received from second searchable feed 1402b. Furthermore, second results web page 1404b displays a second instance of the second feed widget 1408b and a third feed widget 1408c. As mentioned, second feed widget 1408b enables queries to be submitted to and received from second searchable feed 1402b. Furthermore, third feed widget 1408 enables queries to be submitted and received from third searchable feed 1402c.

As shown in FIG. 14, first feed widget 1408a in first results web page 1404a shows a query response 1410a as a response to a query provided to first searchable feed 1402a. Second feed widget 1408b in first results web page 1404a shows a query response 1410b as a response to a query provided to second searchable feed 1402b. Second feed widget 1408b in second results web page 1404b shows a query response 1410c as a response to a query provided to second searchable feed 1402b. Third feed widget 1408c in second results web page 1404b shows a query response 1410d as a response to a query provided to third searchable feed 1402c.

Figure 15:
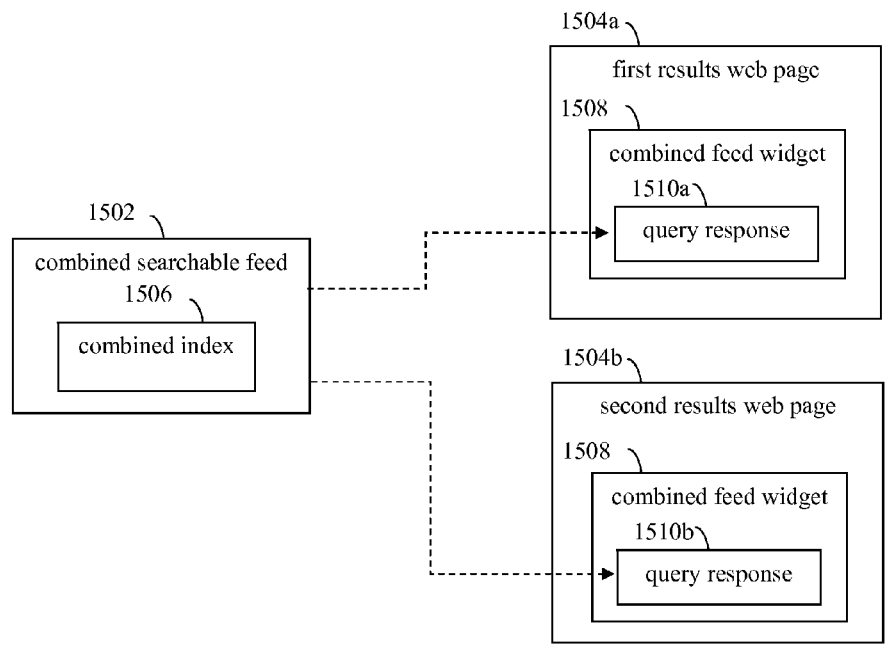
FIG. 15 shows a block diagram of query responses being provided from a combined searchable feed to a plurality of publisher query results pages, according to an example embodiment.

Furthermore, search interface 404 may be used to submit queries to combined searchable feeds that are associated with combined indexes (formed from multiple individual indexes). For instance, FIG. 15 shows a block diagram of query responses being provided from a combined searchable feed to a plurality of publisher query results pages, according to an example embodiment. In FIG. 15, a combined searchable feed 1502 is present that has an associated combined index 1506. Furthermore, first and second results web pages 1504a and 1504b are shown that provided by respective publisher servers to be displayed at respective user devices that submitted queries. For instance, first results web page 15404a displays a first instance of a combined feed widget 1508 and second results web page 1504b displays a second instance of the combined feed widget 1508. Combined feed widget 1508 enables queries to be submitted to and received from combined searchable feed 1502. For instance, as shown in FIG. 15, combined feed widget 1508 in first results web page 1504a shows a query response 1510a as a response to a query provided to combined searchable feed 1502. Combined feed widget 1508 in second results web page 1504b shows a query response 1510b as a response to a query provided to combined searchable feed 1502.

Note that query responses may be transmitted in various forms to entities for display. For instance, as shown in FIGS. 14 and 15, query responses may be transmitted to entities for display in a widget. In further embodiments, query responses may be transmitted to entities in a RSS (real simple syndication) feed, in a web page (e.g., in the form of HTML), as an XML file or file containing other programming code, in a widget, etc.

Figure 16:
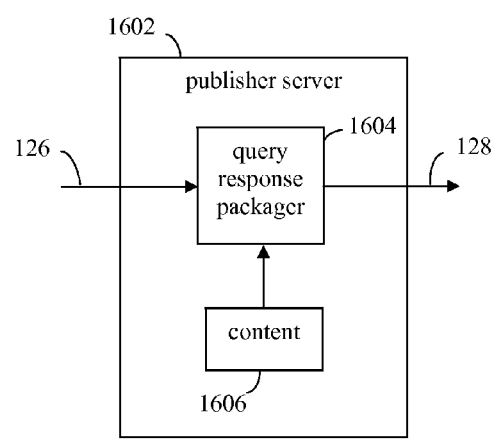
FIG. 16 shows a block diagram of a publisher server configured to package a query response feed with additional content, according to an example embodiment.

In embodiments, the publisher server that receives a query response may format the query response to be displayed on a results web page in any manner. Furthermore, in an embodiment, the publisher server may combine the query response with further content to be displayed on the results web page. For instance, FIG. 16 shows a block diagram of a publisher server 1602 configured to package a query response feed with additional content, according to an example embodiment. Publisher server 1602 is an example of one of publisher servers 122a-122n shown in FIG. 1. As shown in FIG. 16, publisher server 1602 includes a query response packager 1604. Query response packager 1604 receives searchable feed query response 126, and is configured to package content 1606 with searchable feed query response 126 to generate query response 128. As described above, query response 128 may be transmitted to a user device to be displayed to the user (e.g., in a web page, etc.)

Query response packager 1604 may be configured to package various types of content 1606 with a query response. For instance, in one embodiment, query response packager 1604 may contain a map generator. When searchable feed query response 126 includes location information (e.g., restaurant locations), query response packager 1604 may generate map data that is included in query response 128. In this manner, a map may be displayed on the results web page that indicates the location information (e.g., shows locations of restaurants on a map). The map may be displayed alongside the other contents of query response 128. Examples of map generators include mapping tools such as Yahoo!® Maps, MapQuest, and Google™ Maps. In further embodiments, query response packager 1604 may be configured to package additional and/or alternative types of content 1606 with a query response for display in a results web page, such as one or more advertisements (e.g., selected based on a user profile and/or the contents of query response 128) (from which the publisher can obtain revenue), social network information (e.g., displayed in a social network widget), reference information (e.g., accessed from a reference portal such as Wikipedia® (at http://www.wikipedia.com), The Encyclopxdia Britannica® (at http://www.britannica.com/), etc.), and/or other types of content.

III. Example Computer Implementation

Searchable feed generating system 106, searchable feed generating system 300, content retrieval engine 302, indexing engine 304, query interface 306, user interface module 402, web crawler 704, content formatter 706, index generator 802, weight calculator 804, index inverter 806, index combiner 902, query receiver 1002, index querier 1004, response formatter 1006, query response packager 1604, flowchart 200, step 602, and flowchart 1200, and/or any further systems, sub-systems, and/or components disclosed herein may be implemented in hardware, software, firmware, or any combination thereof. For example, searchable feed generating system 106, searchable feed generating system 300, content retrieval engine 302, indexing engine 304, query interface 306, user interface module 402, web crawler 704, content formatter 706, index generator 802, weight calculator 804, index inverter 806, index combiner 902, query receiver 1002, index querier 1004, response formatter 1006, query response packager 1604, flowchart 200, step 602, and/or flowchart 1200 may be implemented as computer program code configured to be executed in one or more processors. Alternatively, searchable feed generating system 106, searchable feed generating system 300, content retrieval engine 302, indexing engine 304, query interface 306, user interface module 402, web crawler 704, content formatter 706, index generator 802, weight calculator 804, index inverter 806, index combiner 902, query receiver 1002, index querier 1004, response formatter 1006, query response packager 1604, flowchart 200, step 602, and/or flowchart 1200 may be implemented as hardware logic/electrical circuitry.

Figure 17:
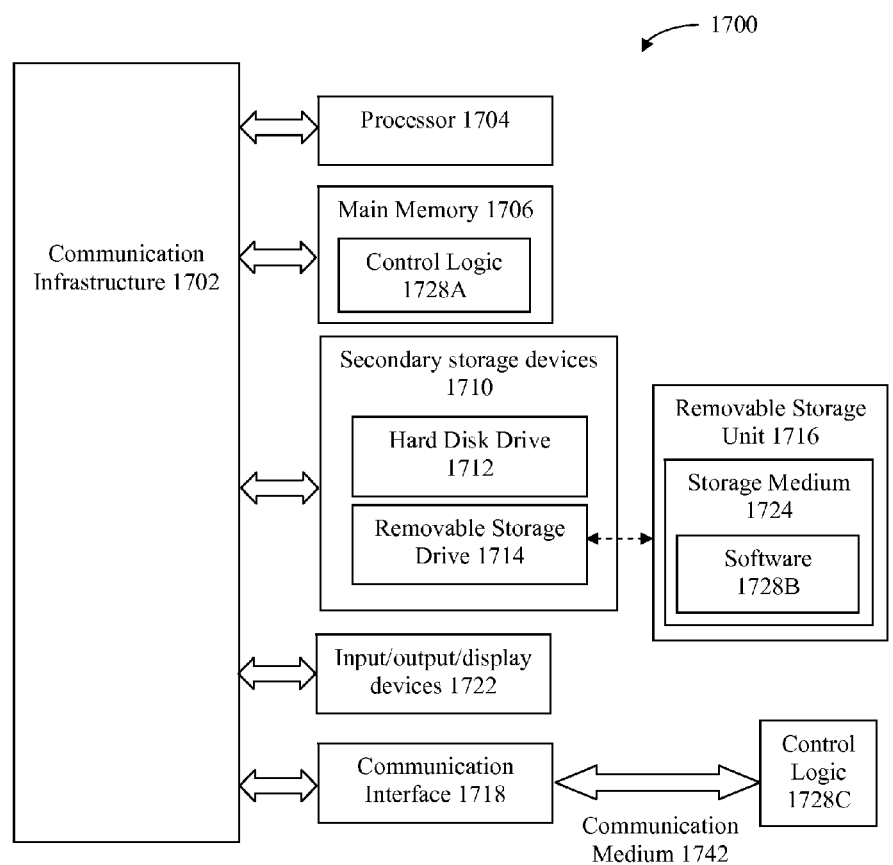
FIG. 17 shows a block diagram of an example computer system in which embodiments may be implemented.

The embodiments described herein, including systems, methods/processes, and/or apparatuses, may be implemented using well known servers/computers, such as a computer 1700 shown in FIG. 17. For example, user devices 104a-104c, searchable feed generating system 106, content servers 112a-112n, publisher servers 122a-122n, searchable feed generating system 300, user device 400, content server 702, publisher server 1602, and any of the sub-systems or components contained therein may be implemented using one or more computers 1700.

When a server, computer 1700 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Such a server may include one or more operating systems, such as Windows Server, Mac OS X, Unix, Linux, FreeBSD, or the like.

When a user device or client device, computer 1700 may include or may execute a variety of operating systems, including a personal computer operating system, such as a Windows, iOS or Linux, or a mobile operating system, such as iOS, Android, or Windows Mobile, or the like. Such a user device or client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. Such a user device or client device may also include or execute an application to communicate content, such as, for example, textual content, multimedia content, or the like. Such a user device or client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Computer 1700 can be any commercially available and well known computer capable of performing the functions described herein, such as computers available from International Business Machines, Apple, Sun, HP, Dell, Cray, etc. Computer 1700 may be any type of computer, including a desktop computer, a server, etc.

Computer 1700 includes one or more processors (also called central processing units, or CPUs), such as a processor 1704. Processor 1704 is connected to a communication infrastructure 1702, such as a communication bus. In some embodiments, processor 1704 can simultaneously operate multiple computing threads.

Computer 1700 also includes a primary or main memory 1706, such as random access memory (RAM). Main memory 1706 has stored therein control logic 1728A (computer software), and data.

Computer 1700 also includes one or more secondary storage devices 1710. Secondary storage devices 1710 include, for example, a hard disk drive 1712 and/or a removable storage device or drive 1714, as well as other types of storage devices, such as memory cards and memory sticks. For instance, computer 1700 may include an industry standard interface, such a universal serial bus (USB) interface for interfacing with devices such as a memory stick. Removable storage drive 1714 represents a floppy disk drive, a magnetic tape drive, a compact disk drive, an optical storage device, tape backup, etc.

Removable storage drive 1714 interacts with a removable storage unit 1716. Removable storage unit 1716 includes a computer useable or readable storage medium 1724 having stored therein computer software 1728B (control logic) and/or data. Removable storage unit 1716 represents a floppy disk, magnetic tape, compact disk, DVD, optical storage disk, or any other computer data storage device. Removable storage drive 1714 reads from and/or writes to removable storage unit 1716 in a well known manner.

Computer 1700 also includes input/output/display devices 1722, such as monitors, keyboards, pointing devices, etc.

Computer 1700 further includes a communication or network interface 1718. Communication interface 1718 enables computer 1700 to communicate with remote devices. For example, communication interface 1718 allows computer 1700 to communicate over communication networks or mediums 1742 (representing a form of a computer useable or readable medium), such as LANs, WANs, the Internet, etc. Network interface 1718 may interface with remote sites or networks via wired or wireless connections.

Control logic 1728C may be transmitted to and from computer 1700 via the communication medium 1742.

Any apparatus or manufacture comprising a computer useable or readable medium having control logic (software) stored therein is referred to herein as a computer program product or program storage device. This includes, but is not limited to, computer 1700, main memory 1706, secondary storage devices 1710, and removable storage unit 1716. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic, such as computer program code or instructions, for implementing the features of searchable feed generating system 106, searchable feed generating system 300, content retrieval engine 302, indexing engine 304, query interface 306, user interface module 402, web crawler 704, content formatter 706, index generator 802, weight calculator 804, index inverter 806, index combiner 902, query receiver 1002, index querier 1004, response formatter 1006, query response packager 1604, flowchart 200, step 602, and/or flowchart 1200 (including any step of flowcharts 200 and 1200), and/or further embodiments described herein. Embodiments of the invention are directed to computer program products comprising such logic (e.g., in the form of program code or software) stored on any computer useable medium. Such program code, when executed in one or more processors, causes a device to operate as described herein.

Note that such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

The invention can work with software, hardware, and/or operating system implementations other than those described herein. Any software, hardware, and operating system implementations suitable for performing the functions described herein can be used.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method implemented on at least one machine having at least one processor, storage, and a communication platform connected to a network for generating searchable feeds for websites, the method comprising:
    displaying at least one page of a website via a designated window;
    receiving, via the designated window, an indication of content of interest of the website;

retrieving a plurality of pages from the website;
identifying the indicated content of interest from the retrieved pages;
generating structured content comprising the indicated content of interest identified from the retrieved pages;
generating an index for the structured content;
receiving a query from an entity, wherein the query includes at least one query term and a feed identifier associated with the index; and
querying, based on the feed identifier, the index with the at least one query term to receive a response to the query.

2. The method of claim 1, wherein said receiving an indication of content of interest comprises:
enabling a user to mark the at least one page of the website to indicate the content of interest.

3. The method of claim 1, further comprising:
transmitting the response to the entity.

4. The method of claim 3, wherein said transmitting comprises:
transmitting the response to the entity in an RSS (real simple syndication) feed, a web page, and/or a widget.

5. The method of claim 3, further comprising:
packaging the response with additional content in a web page; and
wherein said transmitting comprises:
transmitting the web page to a computing device to be displayed in a browser to a user that input the query to a user interface displayed by the browser.

6. The method of claim 1, further comprising:
generating a combined index by combining the index with at least one additional index generated based on content retrieved from at least one additional website;
querying the combined index with the at least one query term to receive the response; and
transmitting the response to the entity.

7. The method of claim 1, further comprising:
receiving, from the entity, the query including the at least one query term and feed identifiers for a plurality of indexes;
querying, based on the corresponding feed identifier, each of the plurality of indexes with the at least one query term to receive a plurality of query responses; and
transmitting the plurality of query responses to the entity.

8. The method of claim 1, further comprising:
receiving, via a second website that is different from the website, the query; and
transmitting, via the second website, the response to the received query.

9. The method of claim 1, wherein said generating the structure content further comprises:
parsing the retrieved pages to identify the indicated content of interest from the retrieved pages.

10. A system having at least one processor, storage, and a communication platform connected to a network for generating searchable feeds for websites, the system comprising:
a user interface module configured to display at least one page of a website via a designated window;
a content retrieval engine configured to receive, via the designated window, an indication of content of interest of the website, retrieve a plurality of pages from the website, identify the indicated content of interest from the retrieved pages, and generate structured content comprising the indicated content of interest identified from the retrieved pages;
an indexing engine configured to generate an index for the structured content; and
a query interface configured to receive a query from an entity, wherein the query includes at least one query term and a feed identifier associated with the index, and query, based on the feed identifier, the index with the at least one query term to receive a response to the query.

11. The system of claim 10, wherein the user interface module is configured to generate a user interface that enables a user to mark the at least one page of the website to indicate the content of interest.

12. The system of claim 10, wherein the content retrieval engine comprises:
a web crawler configured to retrieve the plurality of pages from the website; and
a content formatter configured to process the retrieved pages according to the indicated content of interest to generate the structured content.

13. The system of claim 10, wherein the query interface is further configured to
transmit the response to the entity.

14. The system of claim 13, wherein the query interface is configured to transmit the response to the entity in an RSS (real simple syndication) feed, a web page, and/or a widget.

15. The system of claim 13, further comprising:
a publisher server configured to package the response with additional content in a web page and transmit the web page to a computing device to be displayed in a browser to a user that input the query to a user interface displayed by the browser.

16. The system of claim 10, wherein the indexing engine is configured to generate a combined index by combining the index with at least one additional index generated based on content retrieved from at least one additional website; and
wherein the query interface is configured to query the combined index with the at least one query term to receive the response, and transmit the query response to the entity.

17. The system of claim 10, wherein the query interface is configured to receive the query from an entity, wherein the query includes the at least one query term and feed identifiers for a plurality of indexes; and
wherein the query interface is configured to query, based on the corresponding feed identifier, each of the plurality of indexes with the at least one query term to receive a plurality of query responses and transmit the plurality of query responses to the entity.

18. The system of claim 10, wherein the content retrieval engine is configured to parse the retrieved pages to identify the indicated content of interest from the retrieved pages.

19. A computer readable storage medium storing computer program instructions that, when executed by one or more processors, cause a computer to:
display at least one page of a website via a designated window;
crawl the website to retrieve a plurality of web pages;
receive, via the designated window, an indication of content of interest of the website;
identify the content of interest from the retrieved pages;
generate structured content comprising the content of interest identified from the retrieved pages;
generate an index for the structured content;
receive a query from an entity, wherein the query includes at least one query term and a feed identifier associated with the index; and
query, based on the feed identifier, the index with the at least one query term to receive a response to the query.

20. The computer readable storage medium of claim 19, further causing the computer to:
transmit the response to the entity.

21. The computer readable storage medium of claim 20, further causing the computer to:
- package the response with additional content in a web page; and
- transmit the web page to a computing device to be displayed in a browser to a user that input the query to a user interface displayed by the browser.

22. The computer readable storage medium of claim 19, further causing the computer to:
- generate a combined index by combining the index with at least one additional index generated based on content retrieved from at least one additional website;
- query the combined index with the at least one query term to receive the response; and
- transmit the response to the entity.

23. The computer readable storage medium of claim 19, further causing the computer to:
- receive the query from an entity, wherein the query includes the at least one query term and feed identifiers for a plurality of indexes;
- query, based on the corresponding feed identifier, each of the plurality of indexes with the at least one query term to receive a plurality of query responses; and
- transmit the plurality of query responses to the entity.

24. The computer readable storage medium of claim 19, further causing the computer to:
- parse the retrieved pages to identify the indicated content of interest from the retrieved pages.

* * * * *